United States Patent
Rix

(10) Patent No.: US 10,267,703 B2
(45) Date of Patent: Apr. 23, 2019

(54) ROTOR BALANCING

(71) Applicant: ROLLS-ROYCE PLC, London (GB)

(72) Inventor: Andrew I J Rix, Bristol (GB)

(73) Assignee: ROLLS-ROYCE plc, London (GB)

(*) Notice: Subject to any disclaimer, the term of this patent is extended or adjusted under 35 U.S.C. 154(b) by 177 days.

(21) Appl. No.: 15/426,862

(22) Filed: Feb. 7, 2017

(65) Prior Publication Data
US 2017/0254715 A1 Sep. 7, 2017

(30) Foreign Application Priority Data

Mar. 4, 2016 (GB) .................................. 1603760.8

(51) Int. Cl.
F01D 5/02 (2006.01)
G01M 1/14 (2006.01)
(Continued)

(52) U.S. Cl.
CPC ............. G01M 1/14 (2013.01); F01D 5/027 (2013.01); F01D 25/04 (2013.01); F01D 25/285 (2013.01);
(Continued)

(58) Field of Classification Search
CPC ............ G01M 1/14; G01M 1/30; G01M 1/32; G01M 1/34; G01M 1/36; F01D 5/027;
(Continued)

(56) References Cited

U.S. PATENT DOCUMENTS 4,098,127 A * 7/1978 Shiga ..................... F01D 5/027
 73/462
4,489,606 A * 12/1984 Shiohata ................. G01M 1/22
 73/462
(Continued)

FOREIGN PATENT DOCUMENTS

DE 10 2008 002977 A1 2/2009
EP 2 075 406 A2 7/2009
(Continued)

OTHER PUBLICATIONS

Aug. 24, 2016 Search Report issued in Great Britain Patent Application 1603760.8.
(Continued)

*Primary Examiner* — Helen C Kwok
(74) *Attorney, Agent, or Firm* — Oliff PLC

(57) ABSTRACT

A procedure defining a balancing strategy includes: providing a computer model which predicts the vibration amplitude at a given axial position along the spool when the spool is rotated at a given rotational speed; using the model to predict respective vibration amplitudes at the given axial position for different axial positions of a unit unbalance applied to the spool; plotting the predicted vibration amplitudes as data points on a graph of vibration amplitude against axial position of the applied unit unbalance; using the graph to identify axial positions which are more or less likely to contribute to flexing of the spool at the given rotational speed when mass is added or removed from the first rotor module to reduce imbalances at the axial posi- (Continued)

tions; and defining a balancing strategy based on the identification.

12 Claims, 1 Drawing Sheet

(51) Int. Cl.
  *F16F 15/32* (2006.01)
  *F01D 25/04* (2006.01)
  *G01M 1/30* (2006.01)
  *G01M 1/32* (2006.01)
  *G01M 1/34* (2006.01)
  *F01D 25/28* (2006.01)

(52) U.S. Cl.
  CPC ............... *F16F 15/32* (2013.01); *G01M 1/30* (2013.01); *G01M 1/32* (2013.01); *G01M 1/34* (2013.01); *F05D 2260/15* (2013.01)

(58) Field of Classification Search
  CPC .......... F01D 5/02; F01D 25/04; F01D 25/285; F01D 25/28
  See application file for complete search history.

(56) References Cited

U.S. PATENT DOCUMENTS

| | | | | |
|---|---|---|---|---|
| 5,172,325 A | * | 12/1992 | Heidari | G01M 1/20 700/279 |
| 5,237,505 A | * | 8/1993 | Beebe | G01M 1/326 301/5.22 |
| 5,412,583 A | * | 5/1995 | Cameron | G01M 1/22 700/279 |
| 5,724,271 A | * | 3/1998 | Bankert | F01D 5/027 701/124 |
| 5,915,274 A | * | 6/1999 | Douglas | G01M 1/02 73/462 |
| 7,658,108 B2 | * | 2/2010 | Douglas | G01M 1/14 73/459 |
| 9,182,311 B2 | * | 11/2015 | Clark | F01D 5/027 |
| 9,604,322 B2 | * | 3/2017 | Walters | F01D 5/027 |
| 2008/0075592 A1 | | 3/2008 | Lee et al. | |
| 2009/0037121 A1 | * | 2/2009 | Muralidharan | F01D 5/027 702/35 |
| 2009/0165273 A1 | * | 7/2009 | Calvert | F01D 5/027 29/281.5 |
| 2009/0234481 A1 | * | 9/2009 | Lee | F01D 5/027 700/98 |

FOREIGN PATENT DOCUMENTS

| | | |
|---|---|---|
| JP | 2007-271524 A | 10/2007 |
| WO | 2012/084455 A1 | 6/2012 |

OTHER PUBLICATIONS

Oct. 9, 2017 extended Search Report issued in European Patent Application No. 17154994.2.

* cited by examiner

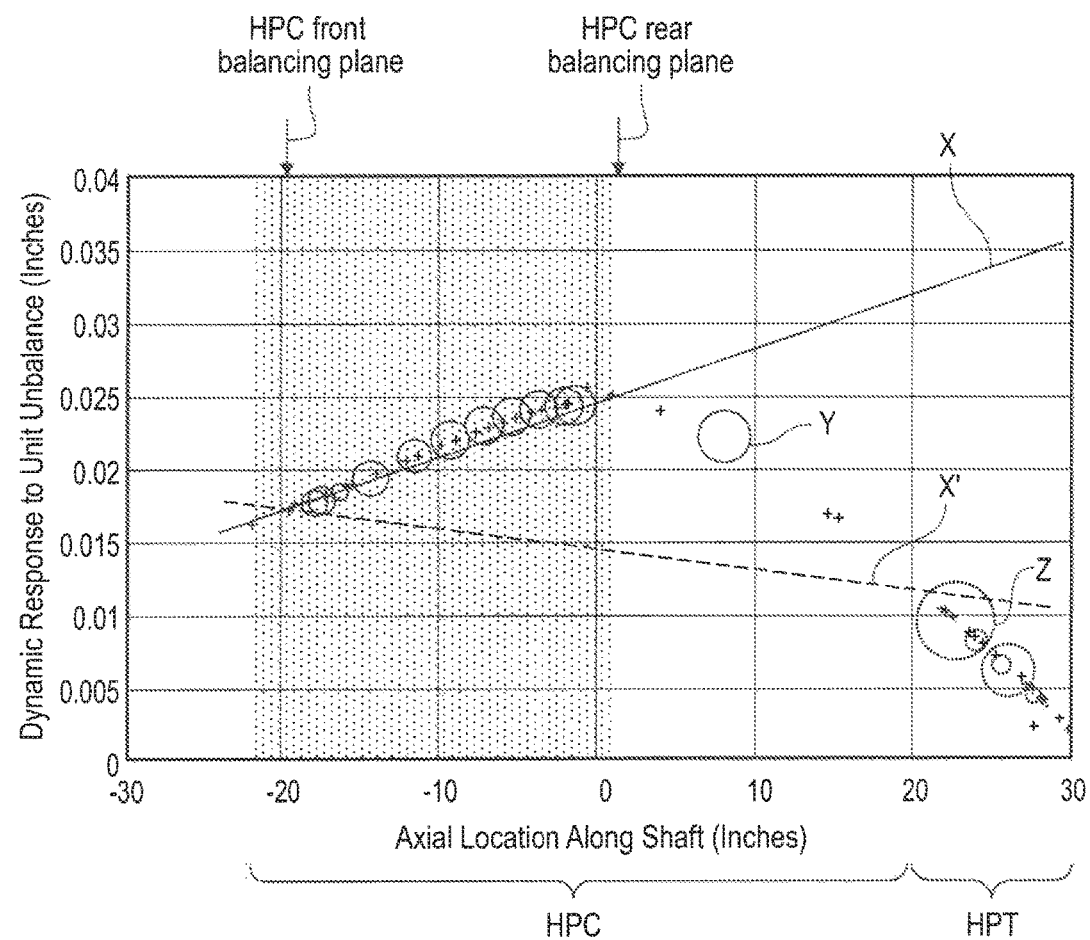

ROTOR BALANCING

FIELD OF THE INVENTION

The present invention relates to rotor balancing, and in particular, but not exclusively, to a procedure for defining a balancing strategy and to the use of that strategy to balance a rotor module.

BACKGROUND

During manufacture of the components making up a rotor module, such as a fan, compressor or turbine assembly in a gas turbine, efforts are made to minimise mass imbalances in the individual components. Nevertheless, mass imbalances will tend to arise in the completed module, for example due to manufacturing tolerances on rotor blades. Consequently, the module as a whole must undergo a balancing operation in order to prevent subsequent stress and vibration during operation of the module.

The vibration that is of principle concern is generally the resonant vibration. This has a maximum amplitude when the speed of rotation of the rotor is at a critical speed (i.e. rotational speed matching natural frequency). Imbalances within the spool tend to drive the resonant vibration and increase its amplitude. This may cause excessive wear and stress on bearings for the spool, as well as its rotors. The balancing operation thus reduces imbalances and/or balances to compensate for them.

A spool of a gas turbine engine may be made up of plural modules, each treated independently from a balancing point of view. For example, one module can be a high pressure compressor assembly and another can be a high pressure turbine assembly, but a "module" can also be a part thereof, i.e. a sub-assembly. Each module on the spool is typically balanced in its own right, rather than balance being simply obtained across the whole spool. This allows individual modules to be substituted without a need to re-balance the rest of the spool.

In balancing a module the following sources of imbalance are generally considered and compensated for:
1) Unbalance that arises within the module due to geometric errors, such as blades being slightly different weights, or the rotor being slightly radially mal-positioned with respect to the axis of rotation.
2) Unbalance that arises within the module due to the module's geometric error at its interface with another module. In particular, the interface may not be square as a consequence of the sum of miss-alignments of sub-units of the module.
3) Unbalance that arises outside of the module (that is, in the adjacent module) due to the module's geometric error at its interface with that other module.

To balance each module in its own right, an unbalance caused by the module must be corrected on a balancing plane within that module, even if the unbalance is of type 3).

A two plane balancing correction is typically carried out by addition or removal of mass from the module at two axially spaced-apart balancing planes which extend perpendicular to the geometric axis of the assembly. In particular, weight be added or removed from axially spaced balancing lands, which are usually located at respective ends of the module. This is achieved using a balancing machine, on which the module is rotated and its imbalances are measured. To account for unbalance of type 3), a mass simulator to simulate the (balanced) adjacent module may be used on the balancing machine.

Additionally or alternatively, imbalances can be reduced with particular build techniques such as: component balancing (balancing each component of the module), straight build (eliminating as far as possible the geometric errors that give rise to type 2) and 3) unbalance through careful building up of the sub-units of the module), and blade distribution (arranging the blades of different weights to better balance one another).

A difficulty with the use of balancing lands is that they may be significantly axially spaced from the unbalance that they are compensating for, especially in the case of type 3) unbalance. This axial spacing between the unbalance and its compensating balancing mass creates a bending moment, which may not be detectable at the low rotation speed of the balancing machine. If the bending moment results in flexing at higher rotation speeds, this can create a new imbalance that may drive the resonant vibration.

It would be desirable to perform balancing operations in a more efficient manner, which avoids, as far as possible, unnecessary expensive balancing activities (e.g. component balancing, straight build and/or blade distribution work) and also avoids the production of bending moment which cause flexing at higher rotation speeds.

SUMMARY

The present invention is at least partly based on a realisation is that, even when balancing corrections create bending moments, it is possible to determine whether parts of a spool will behave flexibly or rigidly with respect to the resonant vibration at a critical rotation speed of that spool, and therefore will or will not drive the resonant vibration. This determination can then be used to promote improved design and balancing decisions.

Accordingly, in a first aspect, the present invention provides a procedure for defining a balancing strategy to reduce mass eccentricity imbalances produced by a first rotor module which in use is attached to one or more further rotor modules to form a spool, the procedure including the steps of: providing a computer model which predicts the vibration amplitude at a given axial position along the spool (e.g. at a bearing position of the spool) when the spool is rotated at a given rotational speed; using the model to predict respective vibration amplitudes at the given axial position for different axial positions of a unit unbalance applied to the spool; plotting the predicted vibration amplitudes as data points on a graph of vibration amplitude against axial position of the applied unit unbalance; using the graph to identify axial positions which are more or less likely to contribute to flexing of the spool at the given rotational speed when mass is added or removed from the first rotor module to reduce imbalances at the axial positions; and defining a balancing strategy based on the identification.

However, rather than implementing the procedure using a computer model of the spool, it can also be performed on a real spool. Thus, in a second aspect, the present invention provides a procedure for defining a balancing strategy to reduce mass eccentricity imbalances produced by a first rotor module which in use is attached to one or more further rotor modules to form a spool, the procedure including the steps of: rotating the spool at a given rotational speed (e.g. in a balancing machine or in situ in an engine); measuring respective vibration amplitudes at a given axial position along the spool (e.g. at a bearing position of the spool) for different axial positions of a unit unbalance applied to the spool; plotting the predicted vibration amplitudes as data points on a graph of vibration amplitude against axial position of the applied unit unbalance; using the graph to identify axial positions which are more or less likely to contribute to flexing of the spool at the given rotational speed when mass is added or removed from the first rotor module to reduce imbalances at the axial positions; and defining a balancing strategy based on the identification. In the second aspect, the further rotor modules of the spool can be real rotor modules or mass simulators of such modules.

The identification of axial positions which are more or less likely to contribute to flexing of the spool facilitates relates to how much bending moment a given section of rotor module can withstand without causing excessive vibration, so that can be traded against other sections in the balancing strategy.

A further aspect of the present invention provides a method of reducing dynamic imbalance produced by a first rotor module, which in use is attached to one or more further rotor modules to form a spool, the method including: performing the procedure of the first or second aspect; and balancing the first rotor module according to the defined balancing strategy. The first rotor module can be a module of a spool of a gas turbine engine.

Optional features of the invention will now be set out. These are applicable singly or in any combination with any aspect of the invention.

The given rotational speed may be in a speed range in which the spool is susceptible to resonant vibration. For example, the given rotational speed can be a rotational speed matching a natural frequency of the spool.

The procedure may further include the step of including indicators on the graph, at different axial positions, of likely average unbalance due to module component mass eccentricity at the respective axial position, wherein the defined balancing strategy is also based on the likely average unbalances.

The first rotor module may have two axially spaced apart balancing planes; the data points may include a pair of data points for the predicted/measured vibration amplitudes when the unit unbalance is applied to the spool at the balancing planes; and the graph may include a straight line which extends through the data points at the balancing planes.

For example, the graph may have a range of axial positions (a "rigid response range") in which the data points lie on the straight line; and when the first rotor module has an imbalance (a "rigid response imbalance") which is identified to lie within the rigid response range, a balancing strategy to address the rigid response imbalance may be defined in which, to the maximum extent possible, mass is added or removed from the first rotor module at the balancing planes to correct the rigid response imbalance.

Additionally or alternatively, the graph may have one or more ranges of axial position ("flexible response ranges") in which the data points do not lie on the straight line; and when the first rotor module has an imbalance (a "flexible response imbalance") which is identified to lie within such a flexible response range, a balancing strategy to address the flexible response imbalance may be defined in which, to the minimum extent possible, mass is added or removed from the first rotor module at the balancing planes to correct the flexible response imbalance. In this case, the balancing strategy may include component balancing, straight building and/or blade distribution procedures to correct the flexible response imbalance.

As another possibility, when the graph has one or more ranges of axial position ("flexible response ranges") in which the data points within the flexible response range(s) do not lie on the straight line; and when the first rotor module has an imbalance (a "flexible response imbalance") which is identified to lie within such a flexible response range, a balancing strategy to address the flexible response imbalance may be defined in which the first rotor module is reconfigured to move the straight line closer to a data point at the axial location of the flexible response imbalance. For example, this may be achieved by moving one of the balancing lands to or closer to the axial location of the flexible response imbalance.

BRIEF DESCRIPTION OF THE DRAWINGS

Embodiments of the invention will now be described by way of example with reference to the accompanying drawing in which:

FIG. 1 shows an example of an unbalance response graph for a high pressure compressor and a high pressure turbine of a gas turbine engine.

DETAILED DESCRIPTION AND FURTHER OPTIONAL FEATURES

FIG. 1 is a graph of dynamic response (i.e. vibration amplitude) to unit unbalance measured at a single fixed sensor (e.g. a bearing location) on a gas turbine engine spool comprising a first module (a high-pressure compressor (HPC)) and a further module (a high-pressure turbine (HPT)) against axial location along the spool. Plotted on the graph are plurality of data points (crosses) at different axial positions. Each point represents the respective vibration amplitude determined at the single sensor when a unit unbalance is applied to spool at the axial position of the data point for a given rotational speed of the spool (e.g. a critical speed for maximum amplitude of resonant vibration). As explained below, the graph is used for defining a balancing strategy to reduce imbalances caused by mass eccentricities in the HPC and HPT.

Conveniently, the data points can be predicted from a computer numerical model of the spool, suitable models being known to the skilled person. The unit unbalance can then simply be applied as a rotating force. However, this does not exclude that the data points can be measured experimentally (e.g. by an accelerometer, a displacement probe, or a bearing force measurement) from a real spool being rotated in a balancing machine or in situ in an engine, with the unit unbalance being applied by balancing weights.

In addition, circles are shown on the graph, the relative diameters of the circles representing the likely average unbalance due to mass eccentricity at the respective axial positions. In particular, the axial position of each circle centre corresponds to the axial position of the centre of mass of a respective module component, and each circle diameter is calculated from the mass of that component multiplied by the average (and therefore most likely) eccentricity of the component. Conveniently, the average eccentricity can be obtained from statistical analysis of rotor samples. Each circle is aligned in the vertical direction, purely for convenience, so that its centre is at the vibration amplitude of the data point which shares the same axial position, but the circle diameters themselves are merely scaled relative to each other to show the relative importance of their likely unbalance. Circles relating to components of the HPC module are drawn with solid perimeters, and circles relating to components of the HPT module are drawn with dashed perimeters.

The HPC module has front and rear balancing planes, the axial positions of which are indicated on the graph. These planes correspond to the axial locations of lands at which balancing weights are added or removed from the module when balancing correction is performed. A straight line X is drawn on graph between the data points at these two axial positions.

If the data points within an axial range of a module lie on straight line X, then in that range the spool is acting rigidly at the given rotational speed when the unit unbalance is applied. That is, movement of the unbalance within the length of that range has a linear effect, and therefore dynamic two plane low-speed balancing of the part of the module in that range should be possible without exciting a mode shape producing vibration. Such balancing is advantageous on grounds of cost and ease of vibration-reduction.

However, if the data points within an axial range of a module do not lie on straight line X, then in that range the spool is acting flexibly, and if a bending moment is applied in the part of the module in that range the shaft will bend, which should excite a mode shape producing vibration. Accordingly, a different balancing strategy should be adopted within the length of that range.

A purpose of the circles is to give a user of the graph an indication of the relative desirabilty of having a particular component (and therefore its circle) close to the line X.

More particularly, the locations available on the HPC module for dynamic two plane low-speed balancing are the front and rear balancing planes. The graph has a range of axial positions (a "rigid response range"—shaded grey on the graph and located towards the front of the HPC) in which the data points lie on the straight line X. If an unbalance (a "rigid response imbalance") occurs somewhere in the response range, it can be balanced at the front and rear balancing lands, and the bending moment induced will not significantly excite the resonant vibration because that region of the spool is behaving rigidly with respect to the resonant vibration. Thus, in this case a suitable balancing strategy to address the rigid response imbalance can be defined in which, to the maximum extent possible, mass is added or removed from the HPC module at the balancing planes to correct the on-line imbalance.

However, the graph also has a range of axial positions (a "flexible response range"—unshaded on the graph and located towards the rear of the HPC and into the HPT) in which the data points do not lie on the straight line X. When an unbalance of the HPC module occurs somewhere in the flexible response range (e.g. due to reason 3) discussed above), the bending moment induced by balancing that imbalance at the balancing lands will induce flexing and drive the resonant vibration. Accordingly, if the balancing land positions are not moved, options to balance the HPC against imbalances in the flexible response range include using compressor component balancing, straight build for the compressor and/or blade distribution procedures to ensure that there is no imbalance induced in the HPT by the HPC. Such approaches may be implemented, for example, to reduce the likely major imbalance from the component indicated Y towards the rear of the HPC. In effect, the result of adopting the approaches is to shrink the diameters of the HPC component circles.

However, these approaches will not address the likely major imbalance caused by, e.g. geometric error at the HPC/HPT interface, from the component indicated Z in the HPT. In this case, therefore, another option is to move the rear balancing land of the HPC rearwards so that it is adjacent the HPT. The straight line X will then be shifted (indicated by dashed line X') so that it passes close to the centre of circle Z. With the major response indicated by circle Z induced by the HPC in the HPT then falling close to the line that passes through the balancing lands, this unbalance can be safely addressed at those lands without inducing bending. However any compressor internal component imbalances will not fall on the line X', and so component balancing, straight build, and/or blade distribution approaches may be needed to eliminate any imbalances within this region (i.e. to shrink the HPC component circles).

Another option is to take an intermediate approach, and place the balancing lands such that the straight line passes somewhere between the HPC component and HPT component responses, and then adopt a balancing strategy with a degree of component balancing/straight build/blade distribution etc. for the HPC, but to a lesser extent than might have been otherwise been required.

Other possible options are to more substantially reconfigure the modules, such as altering where module interfaces lie. As will be appreciated, any approach involving component reconfiguration (even if just movement of a balancing land), may require repetition of the procedure outline above to define an appropriate balancing strategy.

Having defined a balancing strategy for the HPC, a similar procedure can then be performed to define a balancing strategy for the HPT. In this way both modules of the spool can be balanced independently.

Advantageously, the procedure allows the rotor dynamics of a given rotor configuration and low speed balancing requirements to be optimised at the same time. It also allows a multitude of balancing options to be considered with reference to just one graph.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method for defining a rotor balancing strategy to reduce mass eccentricity imbalances produced by a first rotor module that, in use, is attached to at least one second rotor module to form a spool of a gas turbine engine, the comprising steps of:
   providing a computer model that predicts a vibration amplitude at a plurality of given axial positions along the spool when the spool is rotated at a given rotational speed;
   predicting, using the model, respective vibration amplitudes at the plurality of given axial positions of a unit unbalance applied to the spool within a balancing plane of a rotor;
   plotting the predicted vibration amplitudes as data points on a graph of vibration amplitude against axial position of the applied unit unbalance, and overlaying a straight Line of Best Fit on the graph through the data points;
   identifying, using the graph, axial positions that cause flexing of the spool at the given rotational speed when a mass is added or removed from the first rotor module to reduce imbalances at the plurality of given axial positions, the axial positions being identified by determining a proximity of the data points to the overlaid Line of Best Fit on the graph;
   in response to the proximity of the data points to the overlaid Line of Best Fit on the graph satisfying a predetermined condition, defining a rotor balancing strategy based on the identified plurality of axial positions; and in response to the proximity of the data points to the overlaid Line of Best Fit on the graph not satisfying the predetermined condition, (i) shifting the balancing plane of the rotor used to predicting the respective vibration amplitudes at the plurality of given axial positions, and (ii) re-performing the plotting and identifying steps until the proximity of the data points to the overlaid Line of Best Fit on the graph satisfies the predetermined condition.

2. A method for defining a rotor balancing strategy to reduce mass eccentricity imbalances produced by a first rotor module that, in user, is attached to at least one second rotor module to form a spool of the gas turbine engine, the method comprising steps of:

rotating the spool at a given rotational speed;

measuring respective vibration amplitudes at a plurality of given axial positions along the spool of a unit unbalance applied to the spool within a balancing plane of a rotor;

plotting the predicted vibration amplitudes as data points on a graph of vibration amplitude against axial position of the applied unit unbalance, and overlaying a straight Line of Best Fit on the graph through the data points;

identifying, using the graph, axial positions that cause flexing of the spool at the given rotational speed when a mass is added or removed from the first rotor module to reduce imbalances at the plurality of given axial positions, the axial positions being identified by determining a proximity of the data points to the overlaid Line of Best Fit on the graph;

in response to the proximity of the data points to the overlaid Line of Best Fit on the graph satisfying a predetermined condition, defining a rotor balancing strategy based on the identified plurality of axial positions; and in response to the proximity of the data points to the overlaid Line of Best Fit on the graph not satisfying the predetermined condition, (i) shifting the balancing plane of the rotor used to predicting the respective vibration amplitudes at the plurality of given axial positions, and (ii) re-performing the plotting and identifying steps until the proximity of the data points to the overlaid Line of Best Fit on the graph satisfies the predetermined condition.

3. The method according to claim 1, wherein the given rotational speed is in a speed range in which the spool is susceptible to resonant vibration.

4. The method according to claim 1, further including the step of:

including indicators on the graph, at different axial positions of the plurality of axial positions, of average unbalance due to module component mass eccentricity at the respective axial positions, wherein the defined balancing strategy is also based on the average unbalances.

5. The method according to claim 1, wherein:

the first rotor module has two axially spaced apart balancing planes; and the data points include a pair of data points corresponding to each of the vibration amplitudes when the unit unbalance is applied to the spool at the balancing planes.

6. The method according to claim 5, wherein:

the graph has a range of axial positions in which the data points lie on the Line of Best Fit; and when the first rotor module has a rigid response imbalance which is identified to lie within the range, the balancing strategy to address the rigid response imbalance is defined in which the mass is added or removed from the first rotor module at the balancing planes to correct the rigid response imbalance.

7. The method according to claim 5, wherein:

the graph has at least one range of axial positions in which the data points do not lie on the Line of Best Fit; and when the first rotor module has a flexible response imbalance which is identified to lie within the range, the balancing strategy to address the flexible response imbalance is defined in which the mass is added or removed from the first rotor module at the balancing planes to correct the flexible response imbalance.

8. The method according to claim 7, wherein the balancing strategy includes component balancing, straight building, or blade distribution procedures to correct the flexible response imbalance.

9. The method according to claim 5, wherein:

the graph has at least one flexible response range of axial positions in which the data points within the flexible response range do not lie on the Line of Best Fit; and when the first rotor module has a flexible response imbalance which is identified to lie within the flexible response range, the balancing strategy to address the flexible response imbalance is defined in which the first rotor module is reconfigured to move the Line of Best Fit closer to a data point at the axial location of the flexible response imbalance.

10. The method according to claim 9, including, for the reconfigured first rotor module, repeating the steps of:

providing a computer model;

using the model to predict the vibration amplitudes;

plotting the predicted amplitudes;

using the graph to identify axial positions; and defining a balancing strategy.

11. A method of reducing dynamic imbalance produced by the first rotor module, the method including:

performing the method according to claim 1; and balancing the first rotor module according to the defined balancing strategy.

12. The method according to claim 11, wherein the first rotor module is a module of the spool of the gas turbine engine.

* * * * *